UNITED STATES PATENT OFFICE.

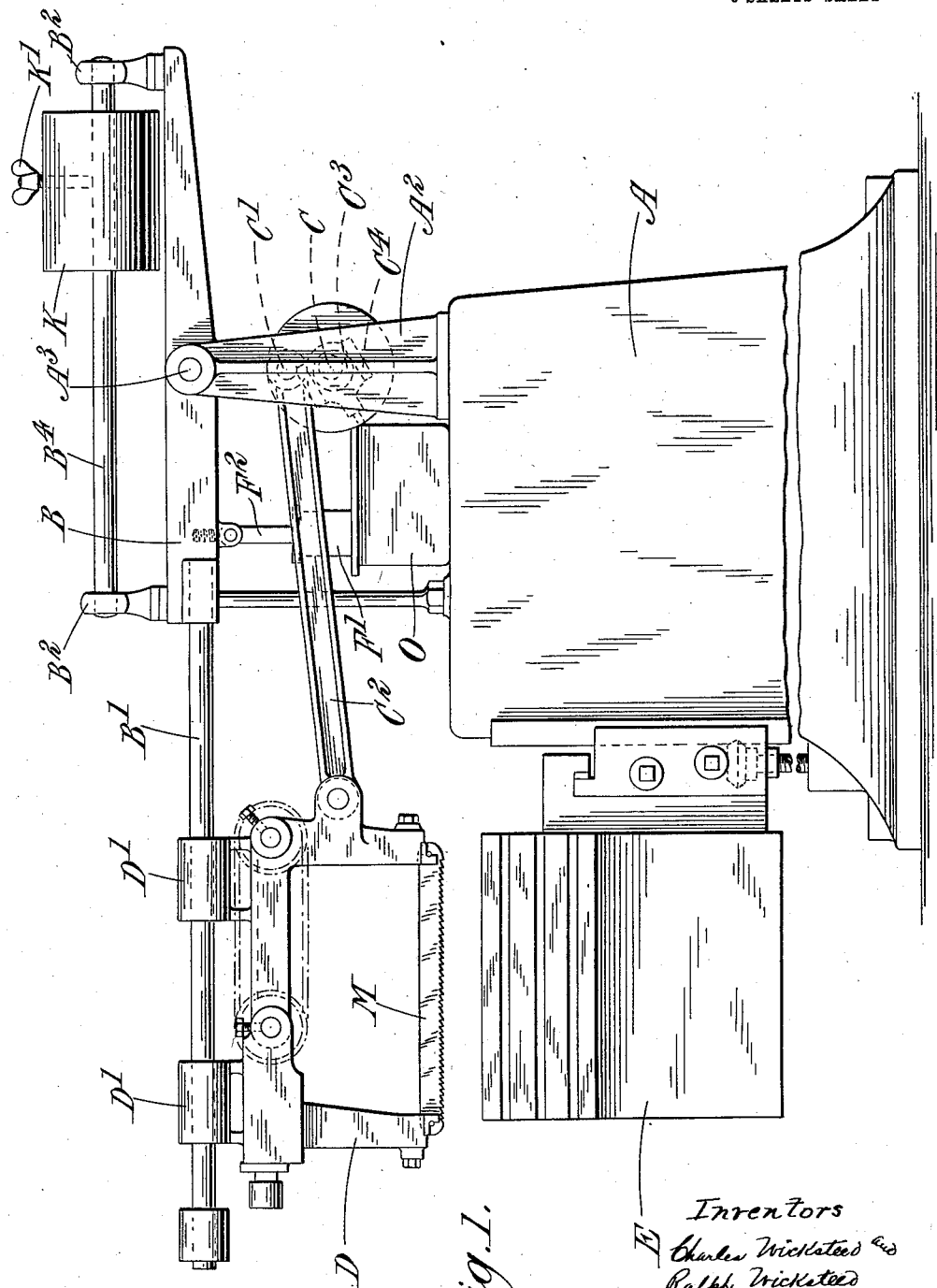

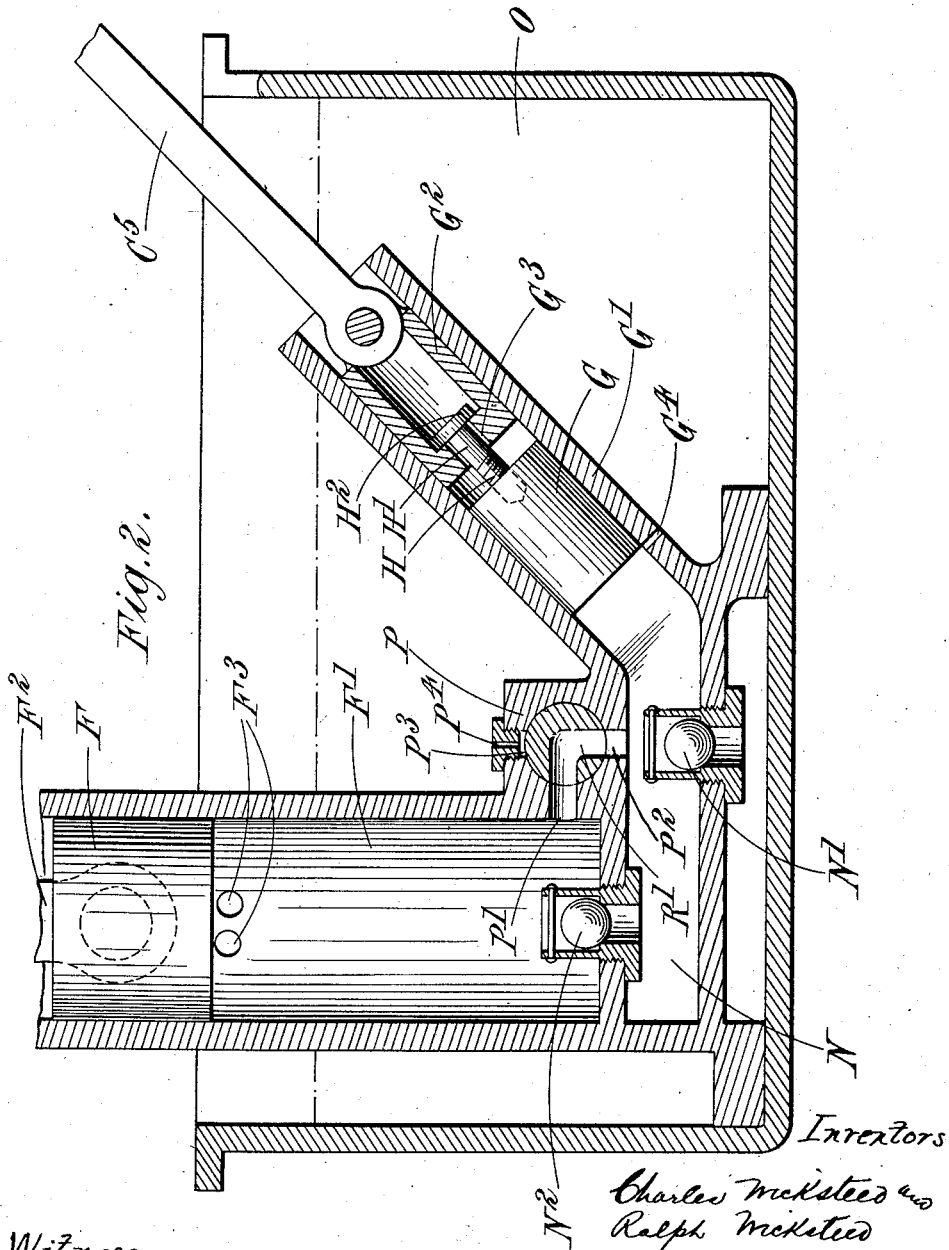

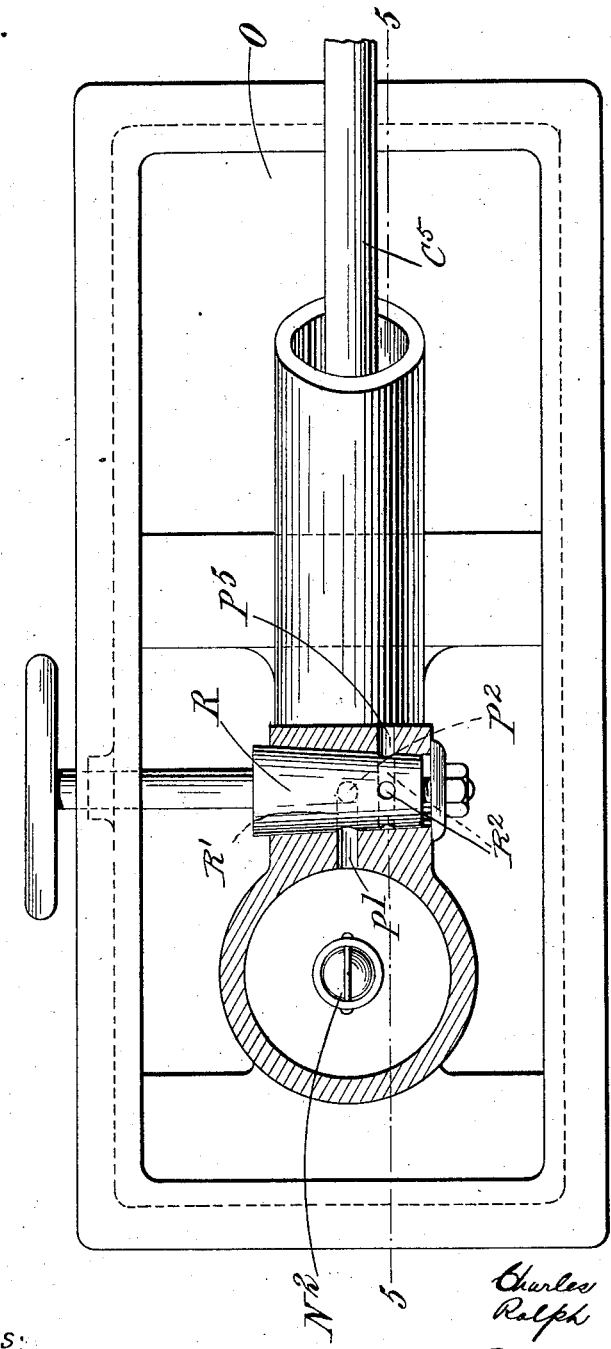

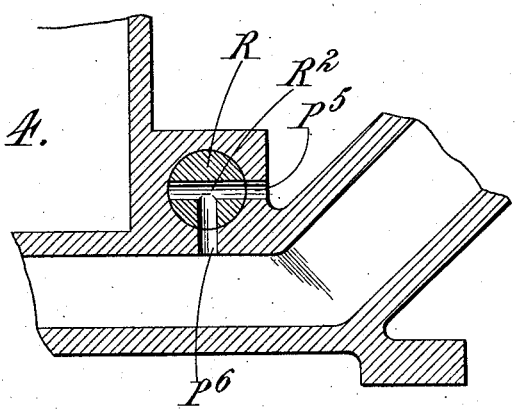
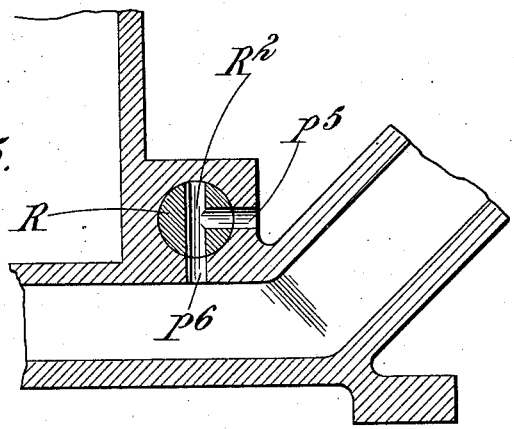
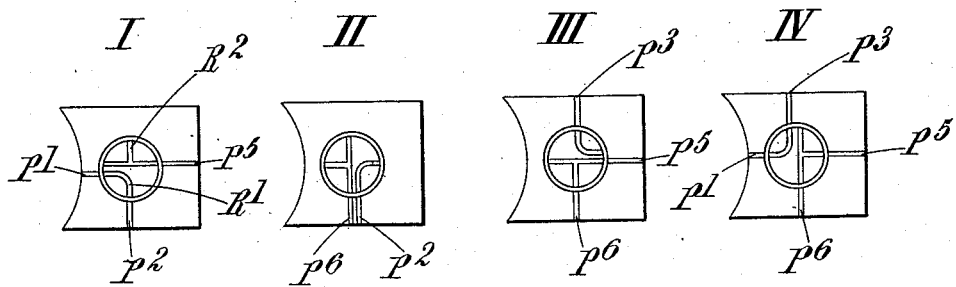

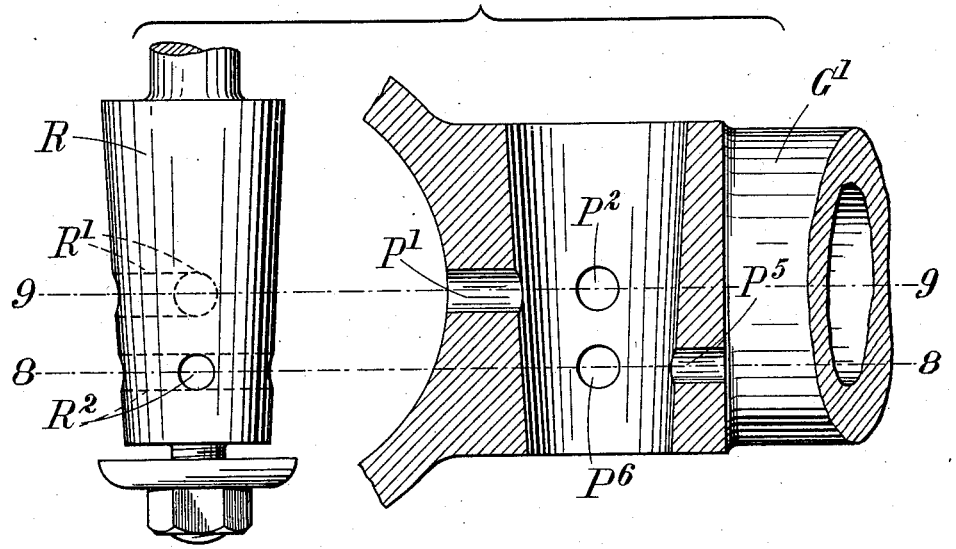
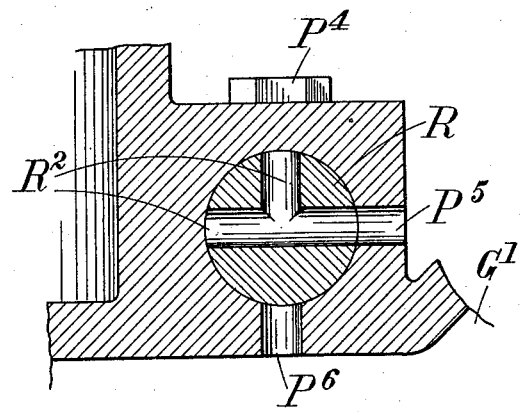
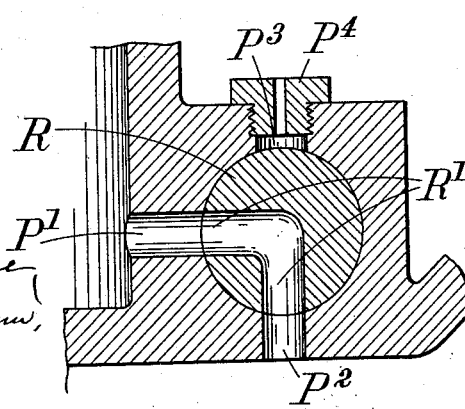

CHARLES WICKSTEED AND RALPH WICKSTEED, OF KETTERING, ENGLAND.

MACHINE-SAW.

1,062,069. Specification of Letters Patent. Patented May 20, 1913.

Application filed April 29, 1911. Serial No. 624,055.

*To all whom it may concern:*

Be it known that we, CHARLES WICKSTEED and RALPH WICKSTEED, both residing at Kettering, England, have invented certain new and useful Improvements in Machine-Saws, of which the following is a specification.

This invention is for improvements in machine saws and has special reference to means for controlling and effecting the motion of approach or withdrawal of the saw to or from the work to be operated upon.

According to this invention the position of the saw in relation to the work is determined by the effect of fluid pressure upon a ram which is in connection with the framework supporting the saw. Movement of the ram in one direction or in the other, according as the fluid pressure is applied or is released, gives to the saw a motion of withdrawal from or of approach to the work in such a manner as to determine the period of contact between saw and work.

The means employed according to the present invention provide for four distinct operations, which are as follows: Firstly, during the working of the saw, it is automatically lifted from its cut on each return stroke and lowered on to the work for the next cutting stroke; secondly, without interruption of the reciprocating movement of the saw, it may be automatically lifted clear of the work; thirdly, while still reciprocating it may be lowered without undue shock on to the work or, fourthly, it may be left in the raised position while still running to permit of re-adjustment of the work.

This invention will now be more fully described with reference to the accompanying drawings, in which—

Figure 1 is an elevation of the power-hack-saw, Fig. 2 is a sectional elevation to a larger scale than that of Fig. 1, of the ram and fluid pressure device with adjacent parts, Fig. 3 is a plan in part section of the parts shown in Fig. 2, Figs. 4 and 5 are vertical sections of a detail on the line 5—5 of Fig. 3, and Fig. 6 is a diagram illustrating in detail the operation of one part of this invention. Fig. 7 is a view on a larger scale, showing the casing F in horizontal section and the plug R in elevation, the plug being shown removed from its seat to better show the arrangement of ports. Fig. 8 is a transverse section on line 8—8, Fig. 7, with the plug in its seat, in the same position as shown in Fig. 7. Fig. 9 is a similar section on line 9—9, Fig. 8.

Like letters of reference refer to like parts throughout the drawings.

In the drawings, A is the base of the machine carrying standards $A^2$ upon which an arm or gauntree B is pivoted at $A^3$.

C is a crank-shaft which reciprocates the hack-saw frame D by means of the crank $C^1$ and connecting rod $C^2$.

E is the table on which the work is supported.

F is a ram in its cylinder $F^1$ and G, $G^1$ are the piston and cylinder respectively of a pressure pump, the pump and ram coöperating in the manner hereinafter to be described to produce movements of the gauntree B about the pivot $A^3$ by means of the rod $F^2$ which connects the gauntree with the ram F. The gauntree B is provided with an extension $B^1$ upon which guides $D^1$ forming part of the saw-frame D are free to slide. Projections $B^2$ upon the gauntree B serve to support a guide $B^4$ along which a weight K may be moved and clamped in the desired position by a clamping screw $K^1$. The gauntree B extends in both directions on either side of the pivot $A^3$, as does also the guide $B^4$, thus providing sufficient range of adjustment for the weight K, to control the pressure with which the saw M rests upon the work when lowered upon it; the parts are so proportioned that when the weight K is shifted to that end of its travel most remote from the saw, the latter presses upon the work with the least desired pressure whereas, when it is at the other extremity of its travel, the maximum desired pressure of the saw is obtained.

It is very desirable that the saw in its reciprocations should be lifted from contact with the work on each return stroke, and should be lowered with the required pressure on to the work to effect the next cutting stroke, and this is automatically effected by the joint action of the pump G and ram F upon the gauntree B. The crank shaft C carries an eccentric $C^3$ which, by means of the eccentric strap $C^4$ and connecting rod $C^5$ imparts a reciprocating movement to the plunger of the pump. The plunger of the pump is made in two parts G, $G^2$ the inner member G being connected to the outer member $G^2$ by a lost-motion device. This is provided by the bolt H whose shank $H^1$ passes freely through a hole $G^3$ in the member $G^2$, but whose head $H^2$ engages therewith when the distance between the members G and $G^2$ has reached a predetermined limit, as will be readily understood. By such construction the plunger G will be given an intermittent reciprocation, that is to say, it will be caused to dwell at each end of the stroke for a time greater than the instantaneous dwell of the plunger driven from a crank. The pump cylinder $G^1$ together with the ram cylinder $F^1$ and an extension of the pump forming a pressure chamber N between them are arranged within one continuous casing, and a relief port or escape duct $G^4$ is provided in the wall of the pump cylinder. The whole of this casing is contained within a reservoir O which is filled to the level indicated in chain line with oil or other fluid which can enter the pressure chamber N through the suction valve $N^1$ and in turn, be forced by the plunger G through the delivery valve $N^2$ into the ram cylinder $F^1$.

In the angle formed between the pump cylinder and ram cylinder is a projecting portion P of the casing, arranged to accommodate a by-pass of special construction, which is a prominent feature of this invention.

The casing P has two distinct sets of ports lying in two distinct vertical planes. In the plane of the section of Fig. 2 are three ports, viz, $P^1$ communicating with the ram cylinder $F^1$ beneath the ram F, $P^2$ communicating with the pressure chamber N and $P^3$ communicating with the reservoir O. The port $P^3$ is conveniently provided with a plug $P^4$ pierced with a small passage to serve as a pin-hole port. In the other plane, namely that of the line 5—5 in Fig. 3, the casing has only two ports, viz., $P^5$ communicating with the reservoir O, and $P^6$ communicating with the pressure chamber N. The port $P^2$ in the first plane and the port $P^6$ in the second plane, may, if desired, be joined to form one large port.

Within the casing P is a plug R pierced with two passage-ways $R^1$, $R^2$, disposed in two planes corresponding respectively with those of the three ports $P^1$, $P^2$, $P^3$ and of the two ports $P^5$, $P^6$. The passage-way $R^1$ is L-shaped while the other, $R^2$, is T-shaped, and the registering of these passage-ways with the ports in the by-pass casing will be clearly understood by reference to the diagrams of Fig. 6. In these diagrams, the two passages $R^1$ and $R^2$ are indicated as though they were in the same plane, and in each diagram only those ports in the casing P are indicated which, in that position, are in communication with one of the passages $R^1$, $R^2$. The diagrams show the plug in four successive positions, each of which is reached by rotating the plug through one quarter of a revolution in a counter-clockwise direction from the previous position. The four positions are marked I, II, III, and IV, and ports that are closed in each position of the plug are omitted from the corresponding diagram, for the sake of clearness. Diagram I corresponds with the position of the plug shown in Figs. 2 and 3, and there is, in this position, a free way between the ram cylinder $F^1$ and the pressure chamber N. In the position of Diagram II, the ports $P^2$ and $P^6$ communicate with one end of the passages $R^1$, $R^2$, but the other ends of these passages are closed and the by-pass as such is inoperative. Diagram III corresponds with Fig. 4 and in this position, the port $P^6$, the passage $R^2$ and the port $P^5$ give free communication between the pressure chamber N and the reservoir O. The port $P^3$ is in communication with one end of the passage $R^1$ but the other end of this passage is closed. Diagram IV corresponds with Fig. 5; in this position ports $P^6$ and $P^5$ both register with the passage $R^2$ giving free communication between the pressure chamber N and the reservoir O, and at the same time the port $P^1$ is in communication through the passage $R^1$ with the port $P^3$.

The operation of the parts is as follows:—Assuming that the shaft C rotates continuously, the frame D and the saw M reciprocate back and forth over the work and at the same time the plunger G oscillates within the cylinder $G^1$. The two cylinders and the reservoir are full of oil to the level indicated in chain line. The eccentric $C^3$ is so placed upon the shaft C that, when the saw M is just nearing the end of its cutting stroke, the plunger $G^2$ is descending, and has come into contact with the plunger G. The latter is therefore about to descend and to close the escape port $G^4$. The closing of the port $G^4$ occurs at or at about the commencement of the return stroke of the saw, and when the by-pass is in the position shown in Fig. 2, (and in Diagram I of Fig. 6), the continuous downward movement of the plunger G forces a small quantity of oil through the port $P^2$, passage $R^1$ and port $P^1$ under the ram F, so lifting the saw from its cut. The return motion of the plungers G and $G^2$ causes the escape port $G^4$ to be uncovered at or at about the end of the return stroke of the saw, and the weight of the parts supported by the ram F causes it to descend, following the motion of the pump, and finally to force a small quantity of oil out of the escape port, so permitting the saw to fall until arrested by the work. The result therefore, of working with the by-pass plug in this position, is that the saw is lifted from its cut during the return stroke and lowered on to the work for the cutting stroke, being allowed by the escape of oil from the port $G^4$ to descend at each stroke by the additional small distance required, owing to the amount of material removed by the cut.

If the by-pass plug be turned into the position shown in Diagram II Fig. 6, there is no communication through the by-pass between the ram cylinder and the reservoir, nor between the pressure chamber and the reservoir, with the consequence that the reciprocating plunger G, operates to lift the ram in the well-known way, oil entering the chamber N by the suction valve $N^1$ and being forced into the ram cylinder through the delivery valve $N^2$. In this position therefore, the ram is raised by each downward stroke of the plunger G until the oil escapes through overflow ports $F^3$ in the ram cylinder.

In the position shown in Fig. 4, and Diagram III of Fig. 6, the movement of the plunger G drives oil idly back and forth through the open ports $P^6$ and $P^5$, so failing to produce pressure within the pressure chamber. The ram meanwhile remains supported upon the column of oil beneath it owing to the action of the non-return valve $N^2$. In this position therefore, the saw reciprocates to and fro idly, being held clear of the work, which may meanwhile be readjusted upon the table.

In the position shown in Fig. 5 and Diagram IV of Fig. 6, the plunger G still pumps oil idly in and out from the pressure chamber N to the reservoir O through the ports $P^6$ and $P^5$, but the port $P^1$ is now, through the passage $R^1$, in communication with the pin-hole port $P^4$, so that the weight of the ram together with the parts supported by it, forces oil slowly out from the ram cylinder through the pin-hole thus permitting the saw to descend gradually and without undue shock on to the work.

It will be understood that the construction according to this invention is applicable to many other forms of machine tools, than a hack-saw, and those skilled in the art will have no difficulty in so applying it.

The mechanism has been described as operating to lift the cutting tool, namely the hack-saw from and lower it on to the work, whereas it may be readily applied to operating upon the work to give movement thereof in relation to a cutting tool moving in a fixed path.

What we claim as our invention and desire to secure by Letters Patent is:—

1. In mechanism for removing a machine saw from its work during the return stroke the combination of, a cylinder, a ram therein, a pump whose delivery communicates with the ram cylinder, a reservoir for fluid communicating with the suction valve of the pump, means for putting the ram cylinder into free communication with the pump, means for discharging the ram cylinder, and means for preventing creation of pressure in the pump when the ram is not to be advanced, substantially as set forth.

2. In mechanism for removing a machine saw from its work during the return stroke the combination of, a cylinder, a ram therein, a pump whose delivery communicates with the ram cylinder and that has a relief port so placed as to be covered and uncovered by the pump plunger, a reservoir for fluid communicating with the suction valve of the pump, means for putting the ram cylinder into free communication with the pump, means for discharging the ram cylinder, and means for preventing creation of pressure in the pump when the ram is not to be advanced, substantially as set forth.

3. In mechanism for removing a machine saw from its work during the return stroke the combination of, a cylinder, a ram therein, a pump whose delivery communicates with the ram cylinder and whose plunger has an intermittent action, a reservoir for fluid communicating with the suction valve of the pump, means for putting the ram cylinder into free communication with the pump, means for discharging the ram cylinder, and means for preventing creation of pressure in the pump when the ram is not to be advanced, substantially as set forth.

4. In mechanism for removing a machine saw from its work during the return stroke the combination of, a cylinder, a ram therein, a pump whose delivery communicates with the ram cylinder, a lost motion device for the pump plunger, a reservoir for fluid communicating with the suction valve of the pump, means for putting the ram cylinder into free communication with the pump, means for discharging the ram cylinder, and means for preventing creation of pressure in the pump when the ram is not to be advanced, substantially as set forth.

5. In mechanism for removing a machine saw from its work during the return stroke the combination of, a cylinder, a ram therein, a pump whose delivery communicates with the ram cylinder and that has a relief port so situated as to be covered by the plunger approximately at the beginning of the in-stroke, means for intermittently reciprocating the plunger, a reservoir for fluid communicating with the suction valve of the pump, means for putting the ram cylinder into free communication with the pump, means for discharging the ram cylinder, and means for preventing creation of pressure in the pump when the ram is not to be advanced, substantially as set forth.

6. In mechanism for removing a machine saw from its work during the return stroke the combination of, a cylinder, a ram therein, a pump whose delivery communicates with the ram cylinder, a reservoir for fluid communicating with the suction valve of the pump, a duct communicating between the ram cylinder and the pump, a second duct constituting a discharge outlet for the ram cylinder, a cock controlling both of these ducts and having passages in it so arranged that the ducts can be opened alternatively or both closed, and means for preventing the creation of pressure in the pump when the ram is not to be advanced, substantially as set forth.

7. In mechanism for removing a machine saw from its work during the return stroke the combination of, a cylinder, a ram therein, a pump whose delivery communicates with the ram cylinder, a reservoir for fluid communicating with the suction valve of the pump, a duct communicating between the ram cylinder and the pump, a second duct constituting a discharge outlet for the ram cylinder, a third duct constituting a relief outlet for the pump, a cock controlling all three of these ducts and having passages in it so arranged that the first and third ducts can be separately opened or the second and third ducts can be simultaneously opened or all the ducts can be closed, and means for preventing the creation of pressure in the pump when the ram is not to be advanced substantially as set forth.

8. In mechanism for removing a machine saw from its work during the return stroke the combination of a reservoir for fluid, a cylinder therein, a ram in the cylinder, a pump in the reservoir and whose delivery communicates with the ram cylinder, means for putting the ram cylinder into free communication with the pump, a conduit controlled by a hand-operated valve for putting the ram cylinder into communication with the reservoir, and means for putting the pump into free communication with the reservoir, substantially as set forth.

In testimony whereof we have signed our names to this specification in the presence of two subscribing witnesses.

CHARLES WICKSTEED.
RALPH WICKSTEED.

Witnesses:
HARRY B. BRIDGE,
PERCY HEWITT.

---

Copies of this patent may be obtained for five cents each, by addressing the "Commissioner of Patents, Washington, D. C."